United States Patent [19]

Ohnishi

[11] Patent Number: 5,328,504
[45] Date of Patent: Jul. 12, 1994

[54] IMAGE RECORDING INK

[75] Inventor: Hiroyuki Ohnishi, Nagano, Japan

[73] Assignee: Seiko Epson Corporation, Tokyo, Japan

[21] Appl. No.: 831,653

[22] Filed: Feb. 7, 1992

Related U.S. Application Data

[63] Continuation-in-part of Ser. No. 564,483, Aug. 9, 1990, abandoned.

[30] Foreign Application Priority Data

Aug. 9, 1989 [JP] Japan .................... 1-206551
Aug. 11, 1989 [JP] Japan .................... 1-208863
Jul. 23, 1990 [JP] Japan .................... 2-194240

[51] Int. Cl.$^5$ ............................ C09D 11/00
[52] U.S. Cl. ............... 106/20 D; 106/20 C; 106/22 C; 106/23 C
[58] Field of Search ........... 106/20, 22, 23, 30, 106/31, 32, 20 C, 20 D, 22 C, 23 C

[56] References Cited

U.S. PATENT DOCUMENTS

| | | | |
|---|---|---|---|
| 2,520,429 | 8/1950 | Park et al. ................. | 524/190 |
| 3,455,856 | 7/1969 | Voedisch et al. ........... | 106/23 |
| 3,950,290 | 4/1976 | Drury, Jr. et al. .......... | 106/30 |
| 3,951,892 | 4/1976 | Drury, Jr. et al. .......... | 106/30 |
| 4,246,154 | 1/1981 | Yao ............................ | 524/88 |
| 4,279,653 | 7/1981 | Makishima et al. ........ | 106/20 D |
| 4,289,678 | 8/1981 | Calder et al. ............... | 106/32 |
| 4,299,630 | 11/1981 | Hwang ........................ | 106/20 |
| 4,352,901 | 10/1982 | Maxwell et al. ............ | 106/20 |
| 4,374,670 | 2/1983 | Slocombe .................... | 106/20 |
| 4,427,810 | 1/1984 | Chisvette et al. ........... | 106/20 C |
| 4,490,177 | 12/1984 | Shioi et al. .................. | 106/23 |
| 4,522,654 | 6/1985 | Chisvette et al. ........... | 106/20 C |
| 4,597,794 | 7/1986 | Ohta et al. .................. | 106/22 |
| 4,659,382 | 4/1987 | Kang ........................... | 106/22 |
| 4,692,188 | 9/1987 | Ober et al. .................. | 106/23 |
| 4,705,567 | 11/1987 | Hair et al. ................... | 106/23 |
| 4,789,399 | 12/1988 | Williams et al. ............ | 106/20 |
| 4,880,465 | 11/1989 | Loria et al. .................. | 106/20 C |
| 5,026,427 | 6/1991 | Mitchell et al. ............ | 106/20 D |
| 5,047,084 | 9/1991 | Miller et al. ................ | 106/22 E |
| 5,066,331 | 11/1991 | Hutter et al. ............... | 106/20 R |

OTHER PUBLICATIONS

K. Ishii, "Synthesis of Microgels Using Novel Polyester Resin as Emulsifier and Application . . . to Coatings", Plymr. Matr. Sci. Eng. 52, 448(1985).

*Primary Examiner*—Karl Group
*Assistant Examiner*—Scott L. Hertzog
*Attorney, Agent, or Firm*—Sughrue, Mion, Zinn, Macpeak & Seas

[57] ABSTRACT

An image recording ink composition for use in a printer for recording letters and images with a liquid ink is disclosed, comprising water and a coloring material and containing at least one water-insoluble component. The ink composition is excellent in rapid drying properties, fixing properties, freedom from obstruction in a printing machine, and preservability, and provides an image excellent in terms of blurring, density, gloss, water resistance, and light resistance.

12 Claims, 1 Drawing Sheet

IMAGE RECORDING INK

This is a continuation-in-part of application Ser. No. 07/564,483 filed Aug. 9, 1990, now abandoned.

FIELD OF THE INVENTION

The present invention relates to an image recording liquid ink for use in an image recording printer.

BACKGROUND OF THE INVENTION

In the field of ink jet recording, water-based inks have been mostly used from the viewpoint of odor and safety. Currently employed water-based inks are solution type inks prepared by dissolving various water-soluble dyes in water or a mixed solvent of water and a water-soluble organic solvent and, if desired, by adding various additives to the solution. An ink jet recording system using these inks has many excellent features including: (1) the recording process is easy in nature of direct recording; (2) the recording process is silent; (3) color recording is easily achieved; (4) high-speed recording is feasible; (5) special paper is not required such that the operating cost is low; and (6) ink is jetted in the form of fine droplets such that an image can be formed with a high resolving power. Because of these advantages, ink jet recording technology is being considered for future recording systems.

However, conventional ink jet recording techniques are disadvantageous in that (1) the ink easily runs on paper (blurring) to deteriorate image quality; (2) the rate of ink drying is low which results in smearing or tailing of the ink on non-image areas (ink stain); (3) the fixing property of the ink is poor; (4) the nozzles and ink passageways tend to become obstructed; (5) the image density is low; and (6) the water resistance is poor.

In order to aleviate these disadvantages, it has been proposed to add a specific surface active agent to an ink composition to thereby reduce the surface tension of the ink and to increase absorption of the ink into the paper as disclosed in JP-A-55-29546 (the term "JP-A" as used herein means an "unexamined published Japanese patent application"). Furthermore, U.S. Pat. No. 4,352,691 proposes the use of a strongly basic substance to obtain an ink composition having a high pH value which, when transferred onto paper, chemically dissolves a sizing agent added as a waterproofing agent or a pulp to thereby control spread and absorption of ink dots in paper. JP-A-58-13675 teaches the addition of polyvinylpyrrolidone having a molecular weight of 40,000 or more to an ink composition to control spread of dots and absorption in paper. These proposals, however, did not provide a complete solution to the above-described problems.

SUMMARY OF THE INVENTION

An object of the present invention is to provide an ink composition for image formation which provides an image with sharp outlines free from blurring and having a high density and a high gloss on a veriety of printing materials including fine paper, bond paper, PPC paper, OHP paper and recycled paper.

Another object of the present invention is to provide an ink composition for image formation which is rapidly dried and fixed to thereby prevent staining and to achieve full color recording through high-speed printing and overprinting of process colors.

A further object of the present invention is to provide an ink composition for image formation having excellent jetting stability and excellent preservability, and which does not cause obstruction of nozzles and the ink passageway.

An additional object of the present invention is to provide an ink composition for image formation which forms an image having excellent resistance to water and light.

The ink composition of the present invention solves the problem of obstruction of the nozzles of an ink jet printer, while providing an ink having excellent preservability (i.e., re-dispersibility). The present inventor discovered that both of these properties are advantageously imparted to an image recording ink composition formulated in accordance with the present invention. Re-dispersibility is a physical property of an ink, and is a measurement of the degree to which aggregates can be re-dispersed upon contact with water. Namely, when a re-dispersible film comprising a resin, etc., is formed by evaporation of water, the film is readily dispersed by the addition thereto of water or ink. Thus, an excellent re-dispersibility property allows an ink composition to be stored over a long period of time.

The above objectives are achieved by providing an ink composition for image formation for use in a printer for recording letters and images with a liquid ink, comprising water and a coloring material and containing at least one water-insoluble component.

In a preferred embodiment in accordance with the present invention, the image recording ink composition comprises water, a pigment insoluble in both water and oil, and a water-soluble resin as exemplified by Example 10 below.

In another preferred embodiment in accordance with the present invention, the image recording ink composition comprises water, a water-soluble dye, a water-insoluble resin and a solvent having a high-boiling point and low volatility as exemplified by Example 9 below.

BRIEF DESCRIPTION OF THE DRAWING

In FIGURE 1, printed material A comprises fibers 2 and has formed thereon an ink dot having outline 1.

DETAILED DESCRIPTION OF THE INVENTION

Figure 1:
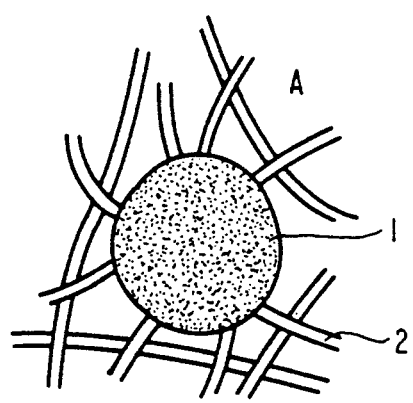
FIGURE 1 schematically illustrates a dot of an ink composition of the present invention formed on a printed material.

The ink composition of the present invention comprises water and a coloring material and contains at least one water-insoluble component.

Coloring materials for use in the present invention include conventional water-soluble dyes, oil-soluble dyes and dispersed dyes, as long as the coloring material does not undergo change in hue or precipitate on addition of other ink components.

Specific examples of the water-soluble dyes include C.I. Direct Yellow 1, 8, 11, 12, 24, 26, 27, 28, 33, 39, 44, 50, 58, 85, 86, 87, 88, 89 and 98; C.I. Acid Yellow 1, 3, 7, 11, 17, 19, 23, 25, 29, 38, 44, 79, 127 and 144; C.I. Basic Yellow 1, 2, 11 and 34;C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; C.I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254 and 289; C.I. Basic Red 1, 2, 9, 12, 14, 17, 18 and 37; C.I. Direct Blue 1, 2, 6, 15, 22, 25, 41, 71, 76, 78, 86, 87, 90, 98, 163, 165 and 202; C.I. Acid Blue 1, 7, 9, 22, 23, 25, 29, 40, 41, 43, 45, 78, 80, 82, 92, 127 and 249; C.I. Basic Blue 1, 3, 5, 7, 9, 22, 24, 25, 26, 28 and 29; C.I. Direct Black 2, 7, 19, 22, 24, 26, 31, 32, 38, 51, 52, 56, 63, 71, 74, 75, 77, 108 and 154; C.I. Acid Black 1, 2, 7, 24, 26, 29, 31, 44, 48, 50, 52 and 94; and C.I. Basic Black 2 and 8.

Specific examples of oil-soluble dyes include C.I. Solvent Yellow 1, 2, 3, 4, 5, 6, 7, 8, 9, 10, 11, 12, 14, 15, 16, 17, 19, 21, 26, 27, 29, 30, 35, 39, 40, 46, 49, 50, 51, 56, 61, 80, 86, 87, 89 and 96; C.I. Solvent Red 1, 2, 3, 8, 16, 17, 18, 19, 20, 22, 23, 24, 25, 26, 27, 30, 49, 52, 59, 60, 63, 67, 68, 81, 82, 84, 100 and 121; C.I. Solvent Blue 2, 6, 11, 12, 15, 20, 25, 30, 31, 32, 35, 36, 55, 58, 71, 72 and 73; and C.I. Solvent Black 3, 5, 7, 10, 11, 12, 13, 22 and 23.

Specific examples of dispersed dyes include C.I. Disperse Yellow 1, 3, 4, 7, 8 and 31; C.I. Disperse Red 1, 4, 5, 7, 11 and 12; C.I. Disperse Blue 1, 3, 5, 6, 7 and 27; and C.I. Disperse Black 1, 2, 10, 26, 27 and 28.

A pigment can also be used as the coloring material of the present invention, and useful pigments include inorganic pigments (e.g., carbon black) and organic pigments (e.g., insoluble azo pigments, soluble azo pigments, phthalocyanine pigments, isoindolinone pigments, quinacridone pigments, perinone pigments and perylene pigments). Processed pigments obtained by treating the surface of pigment particles with resins, etc. (e.g., graft carbon) may also be used.

Specific examples of inorganic pigments include acidic carbon blacks (MA-100, #1000, MA-7, MA-8 and MA-11, manufactured by Mitsubishi Kasei Corporation; Raven 1255, 1250, 1060, 1035, 1040, 1020, 1000 and 760, manufactured by Columbian Carbon Japan Ltd.) and graft carbon (GPT-505P manufactured by Ryoyu Kogyo).

In order to improve dispersion stability of ink composition during storage and recorded image quality, the acidic carbon blacks are preferably used.

Specific examples of organic pigments include C.I. Pigment Yellow 1, 2, 3, 5, 12, 13, 14, 15, 17 and 83; C.I. Pigment Red 1, 2, 3, 4, 5, 7, 9, 12, 22, 23, 37, 38, 81 and 146; C.I. Pigment Blue 1, 2, 15, 16 and 17; and C.I. Pigment Black 1.

The colored particles or pigment particles are preferably pulverized to have a particle diameter of not more than 1.0 μm.

The coloring material is preferably used in an amount of from 1 to 16% by weight, more preferably from 1 to 10% by weight, particularly preferably from 1.5 to 6% by weight, based on the ink composition. If the amount is less than 1% by weight, it is difficult to obtain the desired hue and density. If the addition amount exceeds 16% by weight, the ink tends to cause obstruction or reduce the storage stability.

The dyes are preferably used in an amount of from 1 to 6% by weight based on the ink composition.

The pigments are preferably used in an amount of from 1 to 10% by weight, more preferably from 1.5 to 6% by weight, based on the ink composition.

When a dye is used as the coloring material, the dye is used together with the water-insoluble component. For example, the dye can be impregnated, chemically adsorbed or loaded into a water-insoluble polymer dispersion particle.

Where a pigment is used as a coloring material, the pigment itself can be used as a water-insoluble component by dispersing the same in water. Alternatively, the pigment can be used together with one or more other water-insoluble components.

The water-insoluble polymer other than a coloring material for use as a water-insoluble component of the present invention includes homo- or copolymer resin emulsions of vinyl esters, acrylic esters, methacrylic esters, styrenes, olefins, or monomers having a hydrophilic functional group, e.g., an amino group, a carboxyl group, an amido group, a hydroxyl group, etc.; organic ultrafine particles having an internal three-dimentional cross-linked structure; microemulsions; colloidal dispersions; and natural or synthetic wax emulsions, e.g., paraffin wax, microcrystalline wax, polyethylene wax, and carnauba wax. The organic ultrafine particles having an internal three-dimentional cross-linked structure are described, for example, in K. Ishii et. al.; Proc. ACS Div. PMSE, 52, 448 (1985), S. Ishikawa et. al.; Prog. in Org. Coatings, 15, 373 (1988), and K. Ishii et. al.; XIX, FATIPEC KONGRESS, vol. IV, p.187 (1988). With respect to the conventional resin emulsion, particles therein are fused with each other due to evaporation of water to form a film. However, the organic ultrafine particles having an internal three-dimentional cross-linked structure do not form a film due to a fusion, although they may be agglomerated, and an emulsion thereof can be re-dispersed. Accordingly, the emulsion of the organic ultrafine particles insures an effect of preventing obstruction of nozzles and the ink passageway, without adding a large amount of humectant. Further, because a viscosity of the emulsion of the organic ultrafine particles increases due to evaporation of water, the emulsion improves the fixing properties of coloring material on printing paper and prevents running (blur). Among the microemulsions, ultramicroemulsions (PB-300 series manufactured by Kao Corporation) are preferred because they are stable at low temperature (0° C.) and high temperature (50° C.) and improve storage stability of ink composition. Among the colloidal dispersions, water sols (CD-520, CD-530 and CD-540, manufactured by Dainippon Ink & Chemicals, Inc.) are preferred. These water-insoluble components other than coloring material can be prepared by, for example, pulverizing a polymer obtained by emulsion polymerization, suspension polymerization, dispersion polymerization or other polymerization processes. Furthermore, inorganic ultrafine particles such as a colloidal silica ("Adelite" manufactured by Asahi Denka Kogyo K.K.), etc. can be used.

An emulsion having an average particle size of 0.1 μm or less is called a "microemulsion", and an emulsion having an average particle size of from 0.005 to 0.03 μm is called an "ultramicroemulsion". Furthermore, a polymeric ultrafine particle having an internal three-dimensional cross-linked structure is called an "organic ultrafine particles". An organic ultrafine particle generally has an average particle size of from 20 nm to 500 nm. The particle can be synthesized by emulsion polymerization. The cross-linked structure can be prepared by co-polymerizing a poly-functional monomer having plural double-bonds. Re-dispersibility can be provided by copolymerizing a functional monomer having a highly hydrophilic nature with the particle having the three-dimensional cross-linked structure on the surface thereof.

The colloidal dispersion, organic ultrafine particles, microemulsion and ultramicroemulsion for use in the present invention are further described below.

(1) Colloidal Dispersion

Type: Semi-solution polymer having properties intermediate between those of a water-soluble resin and a water-dispersible resin (i.e., an emulsion).

If desired, a pH adjustor and an auxiliary solvent can be added to the dispersion to impart water-solubility.

Examples of colloidal dispersions for use in the present invention include shellac, a styrenated shellac, a styrene-maleic acid resin, a rosin-maleic acid resin, casein, a casein derivative and an acrylic copolymer.

Examples of the auxiliary solvent include aqueous ammonia, an organic amine, an inorganic hydroxide and an alcohol.

Particle diameter: 0.001 to 0.1 μm
Molecular weight: 10,000 to 100,000

(2) Organic ultrafine particles (e.g., Microgel manufactured by Nippon Paint Co., Ltd.)
Type: Thermoplastic polymer
Composition: Copolymer or homopolymer of styrene, methylmethacrylic acid, n-butyl-acrylate, acrylic acid, etc., a vinyl acetate polymer, a vinyl chloride polymer, a synthetic rubber (e.g., SBR, NBR), a polyurethane, a polyester, an alkyd resin, an epoxyester polymer, a rosin ester polymer, a polyvinylidene chloride, a silicone resin, a polybutene, an EVA polymer, a polyethylene, a polypropylene, etc.

Particle diameter: 20 nm to 500 nm
Molecular weight: 1,000,000 or larger (3) Microemulsion (e.g., PB-300 series manufactured by Kao Corporation)
Type: Acrylic resin
Typical Monomer Composition: Acrylic acid, methacrylic acid, methylmethacrylic acid, etc.

Particle diameter: 0.1 μm or less
Molecular weight: About 10,000 to 1,000,000.

(4) Ultramicroemulsion
The basic constitution of an ultramicroemulsion is the same as that of a microemulsion as described above.

Particle diameter: 0.005 to 0.03 μm.
Molecular weight: About 10,000 to 1,000,000.

The above described resin emulsion can be used as a water-insoluble colored emulsion by dying with a dye. Furthermore, the resin emulsion can be added as the water-insoluble component other than a coloring material.

The water-insoluble resin emulsion is preferably used in an amount of from 1 to 20% by weight calculated as a solid content, based on the ink composition.

The water-insoluble component is preferably used in an amount of from 2 to 30% by weight based on the ink composition.

The water-insoluble component preferably has a particle diameter of from 0.001 μm to 10 μm. If the particle diameter exceeds 10 μm, the water-insoluble component tends to precipitate.

The solvent having a high-boiling point and low volatility for use in the present invention has a boiling point of at least 180° C. and a vapor pressure of not more than about 0.2 mmHg at room temperature. Examples thereof include glycerin, ethylene glycol, propylene glycol, hexylene glycol, diethylene glycol, diethylene glycol monomethyl ether, diethylene glycol monoethyl ether, diethylene glycol monobutyl ether, 2-pyrrolidone, N-methyl-2-pyrrolidone, 1,3-dimethylimidazolidinone, thiodiglycol, polyethylene glycol, etc. The solvent having a high-boiling point and low volatility is contained in the ink composition in an amount of from 1 to 20 wt %, and preferably from 2 to 15 wt %.

The ink composition of the present invention necessarily contains water. Other solvents which may be used for preparing the ink composition of the present invention include water and water-soluble organic solvents, such as alkyl alcohols having from 1 to 4 carbon atoms, ketones or keto alcohols, ethers, polyalkylene glycols, alkylene glycols having from 2 to 6 carbon atoms in the alkylene moiety thereof, glycerin, lower alkyl ethers of polyhydric alcohols, N-methyl-2-pyrrolidone, and triethanolamine. The water for use in the present invention is ion-exchange treated water. Water-soluble organic solvents used to prepare the ink composition of the present invention may be removed by evaporation.

Water or the ion-exchanged water is preferably used in an amount of from 50 to 95% by weight, more preferably from 60 to 90% by weight, based on the ink composition.

The calcium ion and magnesium ion concentrations in the ion-exchanged water are preferably at most 5 ppm.

The ink composition of the present invention may contain a water-soluble resin in combination with the water-insoluble component in order to improve fixing properties, to adjust the viscosity and to improve drying properties. Examples of useful water-soluble resins include glue, gelatin, casein, albumin, gum arabic, alginic acid, methyl cellulose, carboxymethyl cellulose, polyethylene oxide, hydroxyethyl cellulose, polyvinyl alcohol, polyacrylic acid, polyvinyl ether, and polyvinylpyrrolidone.

The water-soluble resin is preferably used in an amount of from 0.01 to 10% by weight, more preferably from 0.1 to 5% by weight, based on the ink composition.

The ink composition of the present invention other than those wherein a water-soluble dye is dissolved in water may further comprise a penetrant in order to permeate a solvent of the ink composition alone into the printed material. Use of the penetrant retains the coloring material on the surface of the printed material to thereby impart faster drying properties. Examples of the penetrant for use in the present invention include alkali metal hydroxides (e.g., lithium hydroxide, sodium hydroxide and potassium hydroxide), various surface active agents, methyl alcohol, ethyl alcohol, n-propyl alcohol, iso-propyl alcohol, n-butyl alcohol, diethylene glycol monobutyl ether, triethylene glycol monomethyl ether, N-methyl-2-pyrrolidone, and 1,3-dimethyl-2-imidazolidinone.

The penetrant is preferably used in an amount of from 0.005 to 10% by weight, more preferably from 0.01 to 5% by weight, based on the ink composition.

If desired, the ink composition of the present invention may further contain various known additives for printing inks such as dispersing agents, viscosity modifiers, surface-tension modifiers, specific-resistance modifiers, pH adjustors, antifungal agents, chelating agents, etc.

The ink composition of the present invention preferably has a viscosity of not more than 30 mPa.s in the vicinity of a jet nozzle at a working temperature of from 0° to 50° C., taking the stability of the ink supply to a recording head and the stability of jetting ink droplets in high-speed recording into consideration. To achieve a higher speed of recording, a viscosity of from 1.5 to 20 mPa.s is particularly preferred. The term "high-speed recording" means an ability of printing letters at a speed of 2 pages (letter size) per minute.

The ink composition of the present invention preferably has a surface tension of 40 dyne/cm or more. An ink composition having a surface tension of less than 40 dyne/cm tends to blur on paper having a low degree of sizing, to thereby reduce the printing resolution.

The contact angle of the ink composition of the present invention to a material to be transferred is preferably at least 60°, more preferably at least 72°.

Means for uniformly dispersing the coloring component into a dispersing medium include a method of utilizing the effect of an electric double layer at the interface of the coloring material and the dispersion medium, a method of utilizing the protective action of an adsorption layer formed by a surface active agent or a high molecular weight polymeric protective colloid, a method of chemically bonding a high molecular weight polymer having a reactive functional group soluble in the dispersing medium and the surface of a coloring component, and a method of chemically bonding a suitable coupling agent with the surface of a coloring component. Because water having a high polarity is used as a dispersion medium of the present invention, stable dispersability can be obtained.

In the preparation of the ink composition of the present invention, dispersion of the pigment can be carried out by using a pulverizer or a micro-atomizer, such as a ball mill, sand mill, attritor, roll mill, agitator mill, Henschel mixer, colloid mill, ultrasonic homogenizer, high pressure homogenizer, pearl mill, jet mill, angmill, a mechanofusion apparatus (manufactured by Hosokawa Micron), and a hybridization apparatus (manufactured by Nara Kikai Seisakusho).

If desired, the dispersion of the pigment is passed through a filter, etc., which filtering may be carried out under reduced pressure, or under pressure, to remove large particles, dust, contaminants, etc., or the dispersion may be stirred or mixed to obtain a final ink composition.

In drying and fixing of the image recording ink of the present invention, a heat fixing means such as hot air, a heating roll, and infrared rays may be used, if desired.

The ink composition for image formation of the present invention can be used in a conventional on-demand type (so-called Kyser type and thermal ink jet type) ink jet system and in an ink mist system in which an ink mist is generated by ultrasonic wave, etc. The ink composition of the present invention is also applicable to an ink jet system comprising a nozzle plate having a plurality of nozzles and a piezoelectric transducer which is fixed close to the nozzle plate, being soaked in the ink and constituting an independently driven oscillator, wherein an electrical voltage is applied to the piezoelectric transducer to impart a varied pressure to the ink inside the nozzle plate while insulating the part of the transducer in contact with the ink. As a result, the ink is jetted from the nozzles to achieve printing.

When a recording is carried out using the above-described recording system at a flying speed of at least 10 m/sec and at an ink amount of at most 0.2 $\mu$g/dot, high-quality recording can be made, and rapid ink drying properties of a drying speed of at most 10 sec can be realized. Further, a recording method wherein one dot is composed of 2 to 4 microdots of at most 0.05 $\mu$g/dot is more preferred.

The present invention is now illustrated in greater detail with reference to the following Examples and Comparative Examples, but it should be understood that the present invention is not deemed to be limited thereto. All the percents are by weight unless otherwise indicated.

Physical properties of the ink compositions prepared in the Examples below were determined as follows.

a) Viscosity

The stationary viscosity at 20° C. was measured with a Flude Spectrometer manufactured by Rheometrix Far East Co.

b) Surface Tension

The surface tension was measured with a tensiometer manufactured by Kyowa Kaimen Kagaku.

c) Average Particle Size

The average particle size was obtained from the particle size distribution as determined by an $\xi$-potentiometer of a laser light scattering system "ELS 800" manufactured by Ohtsuka Denshi K.K.

d) Contact Angle

The contact angle was measured with an automatic contact angle meter (CZ-A type) manufactured by Kyowa Kaimen Kagaku.

EXAMPLE 1

| | |
|---|---|
| C.I. Solvent Black 23 | 3% |
| Methyl methacrylate | 11% |
| n-Butyl acrylate | 7% |
| Glycidyl methacrylate | 2% |
| Ion-exchanged water | 67.5% |
| Sodium dodecylsulfate | 1% |
| Potassium persulfate | 0.5% |
| Glycerin | 8% |

In a flask equipped with a temperature controller, a stirrer, an inlet for nitrogen, and a dropping funnel, the atmosphere of which had been displaced with nitrogen, were added the sodium dodecylsulfate and ion-exchanged water. After heating the solution to 70° C., a monomer mixture comprising the methyl methacrylate, n-butyl acrylate, and glycidyl methacrylate was dropwise added thereto over 2 hours while dropwise adding the potassium persulfate over 3 hours.

After completion of the addition of the potassium persulfate, the temperature was elevated to 80° C. The mixture was stirred for 1 hour, followed by filtration through a filter having a pore size of 1.2 $\mu$m under reduced pressure to prepare a resin emulsion having an average particle size of 0.8 $\mu$m.

To the resulting resin emulsion was added a solution of the C.I. Solvent Black 23 dissolved in acetone, and the mixture was stirred for two hours. After the acetone was removed by evaporation, the glycerin was added to the resulting mixture followed by stirring for 30 minutes. The mixture was filtered through a filter having a pore size of 1.2 $\mu$m under reduced pressure to obtain a recording ink composition having a surface tension of 48 dyne/cm.

EXAMPLE 2

The same procedure as in Example 1 was repeated except for adding, as a penetrant, 5% of methyl alcohol to the recording ink composition of Example 1 to obtain a recording ink composition having surface tension of 42 dyne/cm.

EXAMPLE 3

| | |
|---|---|
| Carbon black (MA-100 manufactured by Mitsubishi Kasei Corporation) | 6% |
| Acrylic resin (Aron A-20LL manufactured by Toagosei Chemical Industry Co., Ltd.) | 3% |
| Glycerin | 10% |
| Ion-exchanged water | 80% |

The acrylic resin and carbon black were kneaded in a roll mill, and the mixture and the ion-exchanged water were dispersed in a sand mill for 10 hours. The mixture was transferred to a stirring machine, and the glycerin was added thereto. The mixture was filtered through a filter having a pore size of 1 μm under reduced pressure to prepare a recording ink composition having an average particle size of 0.08 μm and a surface tension of 58 dyne/cm.

EXAMPLE 4

The same procedure as in Example 3 was repeated except for adding, as a penetrant, 5% of N-methyl-2-pyrrolidone to the recording ink composition of Example 3 to obtain a recording ink composition having surface tension of 49 dyne/cm.

EXAMPLE 5

| | |
|---|---|
| Carbon black (MA-100 manufactured by Mitsubishi Kasei Corporation) | 6% |
| Polyvinylpyrrolidone (K = 15) | 3% |
| Nonionic dispersing agent (Demol N manufactured by Kao Corporation) | 0.8% |
| Glycerin | 10% |
| Ion-exchanged water | 79.2% |

The ion-exchanged water, polyvinylpyrrolidone, carbon black, and dispersing agent were dispersed in a paint shaker for 15 hours. The dispersion was transferred to a stirring machine, and the glycerin was added thereto. The mixture was passed through a filter having a pore size of 1 μm under reduced pressure to prepare a recording ink composition having an average particle size of 0.2 μm and a surface tension of 63 dyne/cm.

EXAMPLE 6

The same procedure as in Example 5 was repeated except for adding, as a penetrant, 5% of 1,3-dimethyl-2-imidazolidinone to the recording ink composition of Example 5 to obtain a recording ink composition having surface tension of 51 dyne/cm.

EXAMPLE 7

| | |
|---|---|
| Carbon black (MA-100 manufactured by Mitsubishi Kasei Corporation) | 6% |
| Ultramicroemulsion (solid content: 20%, PB-300 manufactured by Kao Corporation) | 30% |
| Glycerin | 15% |
| Ion-exchanged water | 50% |

The ion-exchanged water, nonionic dispersing agent, and carbon black were dispersed in a sand mill for 10 hours, and the ultramicroemulsion and the glycerin were added thereto, followed by stirring for 1 hour. The mixture was passed through a filter having a pore size of 1 μm under reduced pressure to prepare a recording ink composition having an average particle size of 0.08 μm and a surface tension of 48 dyne/cm.

EXAMPLE 8

The same procedure as in Example 7 was repeated except for adding, as a penetrant, 5% of diethylene glycol monobutyl ether to the recording ink composition of Example 7 to obtain a recording ink composition having surface tension of 41 dyne/cm.

EXAMPLE 9

| | |
|---|---|
| C.I. Direct Black 154 | 3% |
| Organic ultrafine particles (solid content: 25%) (Microgel manufactured by Nippon Paint K.K.) | 40% |
| Ion-exchanged water | 52% |
| Glycerin | 6% |

The C.I. Direct Black 154 was dissolved in the ion-exchanged water, and the organic ultrafine particles (solid content: 25%) and glycerin were added to the solution, followed by stirring in a stirring machine for 1 hour. The mixture was passed through a membrane filter having a pore size of 0.8 μm to prepare a recording ink composition having an average particle size of 0.03 μm and a surface tension of 45 dyne/cm.

EXAMPLE 10

| | |
|---|---|
| C.I. Pigment Yellow 12 | 6% |
| Polyvinylpyrrolidone | 4% |
| Nonionic dispersing agent (Demol N manufactured by Kao Corporation) | 4% |
| Glycerin | 10% |
| Ion-exchanged water | 76% |
| C.I. Pigment Red 146 | 6% |
| Polyvinylpyrrolidone | 4% |
| Nonionic dispersing agent (Demol N manufactured by Kao Corporation) | 4% |
| Glycerin | 10% |
| Ion-exchanged water | 76% |
| C.I. Pigment Blue 15 | 6% |
| Polyvinylpyrrolidone | 4% |
| Nonionic dispersing agent (Demol N manufactured by Kao Corporation) | 4% |
| Glycerin | 10% |
| Ion-exchanged water | 76% |

Each of the yellow, magenta, and cyan pigments, polyvinylpyrrolidone, and nonionic dispersing agent were dispersed in a paint shaker for 20 hours. Each dispersion was transferred to a stirring machine, and glycerin was added thereto, followed by filtration through a filter having a pore size of 1 μm under reduced pressure to prepare three recording color ink compositions each having an average particle size of 0.2 μm and a surface tension of 61 dyne/cm.

EXAMPLE 11

The same procedure as in Example 10 was repeated except for adding, as a penetrant, 1% of sodium dioctylsulfosuccinate to the recording color ink compositions of Example 10 to obtain three recording color ink compositions each having surface tension of 43 dyne/cm.

COMPARATIVE EXAMPLE 1 AND 2

For comparison, a commercially available ink for an on-demand ink jet printer (Comparative Example 1) and a commercially available ink for a bubble jet printer (Comparative Example 2) were used. The composition of each of the commercially available inks is shown below.

| Comparative Example 1 | |
|---|---|
| C.I. Direct Black 19 | 2% |
| Glycerin | 15% |
| Ion-exchanged water | 83% |
| Surface Tension | 48 dyne/cm |
| Comparative Example 2 | |
| C.I. Direct Black 19 | 2% |
| Diethylene glycol | 10% |
| Ion-exchanged water | 83% |
| Surface Tension | 46 dyne/cm |

Viscosity, surface tension, and average particle size of each of the ink compositions of Examples 1 to 11 and Comparative Examples 1 and 2 are shown in Table 1 below.

In order to test printability of each of the recording ink compositions, letters or graphics were printed with the ink composition on (A) fine paper for general use, (B) bond paper, (C) PPC paper, (D) recycled paper, or (E) general OHP sheets by the use of a Commercially available on-demand ink jet printer (HG-2500 manufactured by Seiko Epson Corporation) and a multihead produced for experimental use in the manner as disclosed, for example, in U.S. Pat. No. 4,072,959 (jet orifice diameter: 30 μm; piezo-oscillator driving voltage: 40 V; driving frequency: 8 kHz). The resulting recorded image was evaluated according to the following rating system.

1) Blur

The extent of blurring of the recorded image was observed both visually (nakedcye) and under microscopically (100× magnification and 400× magnification).

Excellent—Dots were fixed on fibers without blurring along the fibers under microscopic inspection.

Good—Slight blur was observed along the fibers under microscopic inspection, but was visually imperceptible.

Medium—Slight blurring was observed visually.

Poor—Considerable blurring was visually observed, and the image had a jaggy edge.

2) Rapid Drying Properties

Ten seconds, 30 seconds and 60 seconds after recording, the recorded image was scratched with an edge of paper.

Excellent—No stain was observed after 10 seconds.
Good—No stain was observed after 30 seconds.
Medium—No stain was observed after 60 seconds.
Poor—Stain was observed after 90 seconds.

3) Fixing Properties

One hour after recording, the surface of the recorded image was repeatedly scratched back and forth with a clip under a load of 200 g/cm until a stain appeared.

Excellent—No staining observed after 30 or more reciprocal scratches.
Good—Staining first observed after 20 to 30 reciprocal scratches.
Poor—Staining first observed prior to 20 reciprocal scratches.

4) Obstruction

The ink composition was filled in the above-described ink jet printer and left to stand at 50° C. for 1 month with no cap on the nozzle.

Good—Printing could be conducted right from the without further preparation.
Medium—Printing could be conducted after the ink was circulated for cleaning.
Poor—Printing could not be conducted.

5) Ink Preservability

The ink composition was sealed in a sample bottle and stored at 50° C. for 6 months. Any change, such as the generation of foreign matter or offensive odor, or the formation of agglomerates or precipitates, was observed.

Excellent—No change.
Good—A precipitate was formed but was easily re-dispersed.
Poor—A precipitate was formed and could not be re-dispersed.

6) Recording Density

The reflective optical density (OD) of the recorded image was measured with a Macbeth densitometer (TR-927 type).

7) Water-Resistance

A printed sheet 1 hour after printing was immersed in water for 5 minutes, and the printed sheet thus treated was evaluated for running of the ink.

Good—No running was observed.
Poor—Running was observed.

8) Gloss

The specular gloss at an angle of 75° was measured with a digital glossmeter (manufactured by Murakami Shikisai Gijutsu Kenkyusho).

Good—80 or more
Medium—51 to 79
Poor—50 or less

9) Printability on OHP Paper

Good—Printable
Poor—Unprintable

10) Light Resistance

The recorded image was irradiated with the light of a xenon lamp (400 W) for 100 hours, with the distance between a sample and the lamp being 25 cm, and fading was determined using a blue scale in accordance with JIS L 0841.

Good—At least fourth grade
Poor—Less than fourth grade

The results of these evaluations are shown in Table 2 below.

TABLE 1

| | Example 1 | Example 2 | Example 3 | Example 4 | Example 5 | Example 6 | Example 7 |
|---|---|---|---|---|---|---|---|
| Viscosity (mPa · s) | 4.2 | 4.1 | 5.2 | 5.0 | 2.6 | 2.3 | 4.2 |
| Surface Tension (dyne/cm) | 48 | 42 | 58 | 49 | 63 | 51 | 48 |
| Average Particle (μm) | 0.8 | 0.8 | 0.08 | 0.08 | 0.2 | 0.2 | 0.08 |
| Contact Angle (on PPC paper)(*) | 90 | 78 | 100 | 90 | 105 | 90 | 85 |

| | Example 8 | Example 9 | Example 10 | Example 11 | Comp. Example 1 | Comp. Example 2 |
|---|---|---|---|---|---|---|
| Viscosity (mPa · s) | 4.0 | 2.8 | 4.2 | 4.1 | 1.8 | 2.2 |
| Surface Tension (dyne/cm) | 41 | 45 | 61 | 43 | 48 | 46 |
| Average Particle (μm) | 0.08 | 0.03 | 0.2 | 0.2 | — | — |
| Contact Angle | 75 | 82 | 105 | 75 | 70 | 70 |

TABLE 1-continued (on PPC paper)(*)

TABLE 2

|  | Example 1 | | | | Example 2 | | | |
| --- | --- | --- | --- | --- | --- | --- | --- | --- |
|  | A[1)] | B[2)] | C[3)] | D[4)] | A | B | C | D |
| Blur | Excellent | Excellent | Excellent | Excellent | Excellent | Excellent | Excellent | Excellent |
| Rapid Drying Properties | Good | Good | Good | Good | " | " | " | " |
| Fixing Properties | Excellent | Excellent | Excellent | Excellent | " | " | " | " |
| Obstruction | Good | | | | Good | | | |
| Ink Preservability | Excellent | | | | Excellent | | | |
| Recording Density | 1.5 | | | | 1.4 | | | |
| Water Resistance | Good | Good | Good | Good | Good | Good | Good | Good |
| Gloss | " | " | " | " | " | " | " | " |
| Printability on OHP Sheet | Good | | | | Good | | | |
| Light Resistance | Good | Good | Good | Good | Good | Good | Good | Good |

|  | Example 3 | | | | Example 4 | | | |
| --- | --- | --- | --- | --- | --- | --- | --- | --- |
|  | A | B | C | D | A | B | C | D |
| Blur | Excellent | Excellent | Excellent | Excellent | Excellent | Excellent | Excellent | Excellent |
| Rapid Drying Properties | Good | Good | Good | Good | " | " | " | " |
| Fixing Properties | Excellent | Excellent | Excellent | Excellent | " | " | " | " |
| Obstruction | Good | | | | Good | | | |
| Ink Preservability | Excellent | | | | Excellent | | | |
| Recording Density | 1.5 | | | | 1.4 | | | |
| Water Resistance | Good | Good | Good | Good | Good | Good | Good | Good |
| Gloss | " | " | " | " | " | " | " | " |
| Printability on OHP Sheet | Good | | | | Good | | | |
| Light Resistance | Good | Good | Good | Good | Good | Good | Good | Good |

|  | Example 5 | | | | Example 6 | | | |
| --- | --- | --- | --- | --- | --- | --- | --- | --- |
|  | A | B | C | D | A | B | C | D |
| Blur | Excellent | Excellent | Excellent | Excellent | Excellent | Excellent | Excellent | Excellent |
| Rapid Drying Properties | Good | Good | Good | Good | " | " | " | " |
| Fixing Properties | Excellent | Excellent | Excellent | Excellent | " | " | " | " |
| Obstruction | Good | | | | Good | | | |
| Ink Preservability | Excellent | | | | Excellent | | | |
| Recording Density | 1.6 | | | | 1.5 | | | |
| Water Resistance | Good | Good | Good | Good | Good | Good | Good | Good |
| Gloss | " | " | " | " | " | " | " | " |
| Printability on OHP Sheet | Good | | | | Good | | | |
| Light Resistance | Good | Good | Good | Good | Good | Good | Good | Good |

|  | Example 7 | | | | Example 8 | | | |
| --- | --- | --- | --- | --- | --- | --- | --- | --- |
|  | A | B | C | D | A | B | C | D |
| Blur | Excellent | Excellent | Excellent | Excellent | Excellent | Excellent | Excellent | Excellent |
| Rapid Drying Properties | Good | Good | Good | Good | " | " | " | " |
| Fixing Properties | Excellent | Excellent | Excellent | Excellent | " | " | " | " |
| Obstruction | Good | | | | Good | | | |
| Ink Preservability | Excellent | | | | Excellent | | | |
| Recording Density | 1.6 | | | | 1.5 | | | |
| Water Resistance | Good | Good | Good | Good | Good | Good | Good | Good |
| Gloss | " | " | " | " | " | " | " | " |
| Printability on OHP Sheet | Good | | | | Good | | | |
| Light Resistance | Good | Good | Good | Good | Good | Good | Good | Good |

|  | Example 9 | | | | Example 10 | | | |
| --- | --- | --- | --- | --- | --- | --- | --- | --- |
|  | A | B | C | D | A | B | C | D |
| Blur | Excellent | Excellent | Excellent | Excellent | Excellent | Excellent | Excellent | Excellent |
| Rapid Drying Properties | Good | Good | Good | Good | Good | Good | Good | Good |
| Fixing Properties | Excellent | Excellent | Excellent | Excellent | Excellent | Excellent | Excellent | Excellent |
| Obstruction | Good | | | | Good | | | |
| Ink Preservability | Excellent | | | | Excellent | | | |
| Recording Density | 1.5 | | | | 1.6 | | | |
| Water Resistance | Good | Good | Good | Good | Good | Good | Good | Good |
| Gloss | " | " | " | " | " | " | " | " |
| Printability on OHP Sheet | Good | | | | Good | | | |
| Light Resistance | Good | Good | Good | Good | Good | Good | Good | Good |

|  | Example 11 | | | | Comparative Example 1 | | | |
| --- | --- | --- | --- | --- | --- | --- | --- | --- |
|  | A | B | C | D | A | B | C | D |
| Blur | Excellent | Excellent | Excellent | Excellent | Medium | Medium | Medium | Medium |
| Rapid Drying Properties | " | " | " | " | " | " | " | " |
| Fixing Properties | " | " | " | " | Poor | Poor | Poor | Poor |
| Obstruction | Good | | | | Good | | | |
| Ink Preservability | Excellent | | | | Excellent | | | |
| Recording Density | 1.5 | | | | 1.2 | | | |
| Water Resistance | Good | Good | Good | Good | Poor | Poor | Poor | Poor |
| Gloss | " | " | " | " | Medium | Medium | Medium | Medium |

TABLE 2-continued

| | | | | | Comparative Example 2 | | | |
|---|---|---|---|---|---|---|---|---|
| Printability on OHP Sheet | | Good | | | Poor | | | |
| Light Resistance | Good | Good | Good | Good | Poor | Poor | Poor | Poor |
| | | | | | A | B | C | D |
| | | Blue | | | Medium | Mediumt | Medium | Medium |
| | | Rapid Drying Properties | | | " | " | " | " |
| | | Fixing Properties | | | Poor | Poor | Poor | Poor |
| | | Obstruction | | | Poor | | | |
| | | Ink Preservability | | | Excellent | | | |
| | | Recording Density | | | 1.1 | | | |
| | | Water Resistance | | | Poor | Poor | Poor | Poor |
| | | Gloss | | | Medium | Medium | Medium | Medium |
| | | Printability on OHP Sheet | | | Poor | | | |
| | | Light Resistance | | | Poor | Poor | Poor | Poor |

Note:
A[1]: Fine paper
B[2]: Bond paper
C[3]: PPC paper
D[4]: Recycled paper

As can be seen from the results of Table 2, the recording ink compositions of Examples 1 to 6 of the present invention are markedly superior to the conventional inks for an ink jet recording system in terms of image quality (blur, density, gloss, water resistance and light resistance), rapid drying properties, fixing properties, freedom from obstruction, and ink preservability.

According to the above described Examples of the present invention, on printing, the coloring component of the ink composition of the present invention is adhered in place on the printing material by the cohesive force of the water-insoluble component, such that the ink is solidified and fixed to form dots having sharp outlines as shown in FIG. 1.

As described above, the ink composition of the present invention comprising water and a coloring material and containing at least one water-insoluble component to thereby obtain have a heterogeneous phase, exhibits satisfactory drying properties and fixing properties and provides a clear and high density recorded image having excellent resistance to water and light without causing running (blur). Also, the ink composition of the present invention does not cause obstruction in a printing machine and has excellent preservability.

Furthermore, the ink composition of the present invention is adaptable to high-speed and high-quality printing on general OHP paper, which has not hitherto been employable in a conventional ink jet recording system.

Also, the satisfactory drying and fixing properties of the ink composition of the present invention provides for multicolor printing to obtain a full color image having high resolution by using three process color inks.

In addition, the ink composition of the present invention can be used for printing on recycled paper which is expected to became readily available in the market.

While the invention has been described in detail and with reference to specific embodiments thereof, it will be apparent to one skilled in the art that various changes and modifications can be made therein without departing from the spirit and scope thereof.

What is claimed is:

1. An image recording ink composition having good re-dispersibility for use in a printer for recording letters and images with a liquid ink, consisting essentially of water, a water-insoluble component and a water-soluble resin, said water-insoluble component being a pigment having an average particle diameter of not more than 0.2 μm, wherein aggregates formed in the ink composition are re-dispersed upon contact with water.

2. An image recording ink composition as in claim 1, wherein said water-soluble resin is polyvinylpyrrolidone.

3. An image recording ink composition as in claim 1, further comprising a solvent having a high-boiling point and low volatility.

4. An image recording ink composition as in claim 2, further comprising a solvent having a high-boiling point and low volatility.

5. An image recording ink composition having good re-dispersibility for use in a printer for recording letters and images with a liquid ink, comprising water, a water-soluble dye, a water-insoluble resin and a solvent having a high-boiling point and low volatility, wherein aggregates formed in the ink composition are re-dispersed upon contact with water.

6. An image recording ink composition as in claim 3, wherein said solvent is glycerin.

7. An image recording ink composition as in claim 5, wherein said solvent is glycerin.

8. An image recording ink composition as in claim 5, wherein the water is contained in the ink composition in an amount of from 50 to 90% by weight; the water-insoluble resin is dispersed in the ink composition and has a particle size of from 0.001 to 10 μm, and is contained in the ink composition in an amount of from 1 to 20% by weight calculated as a solid content.

9. An image recording ink composition as in claim 5, wherein the water-insoluble resin comprises organic ultrafine particles.

10. An image recording ink composition as in claim 5, wherein the water-insoluble resin comprises a microemulsion.

11. An image recording ink composition as in claim 5, wherein the water-insoluble resin comprises a colloidal dispersion.

12. An image recording ink composition as in claim 5, consisting essentially of water, a water-soluble dye, a water-insoluble resin and a solvent having a high boiling point and low volatility.

* * * * *